Figure 1:
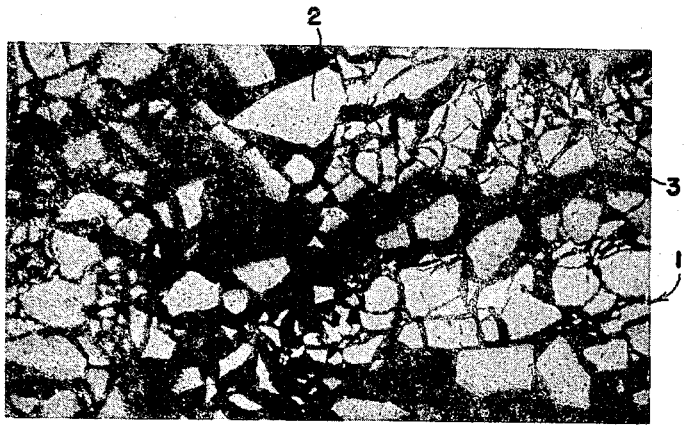

INVENTORS
ELIZABETH M. IVERSON
HAROLD E. POHL
CLAYTON E. WORKMAN

BY  *Gene O. Enochson*

AGENT 3,219,735
PROCESS FOR PRODUCING A DECORATIVE COATING AND PRODUCTS PRODUCED BY SAID PROCESS
Elizabeth M. Iverson, Wayzata, Minn., and Harold E. Pohl and Clayton E. Workman, Kankakee, Ill., assignors to General Mills, Inc., a corporation of Delaware
Filed May 10, 1962, Ser. No. 193,846
24 Claims. (Cl. 264—73)

This application is a continuation-in-part of our earlier application entitled, "One Coat Marbelizing Process," Serial No. 834,916, filed August 20, 1959, now abandoned.

The present invention relates to a process for the production of synthetic coatings and to the articles produced by said process. More particularly, it relates to a method for making a realistic-appearing decorative coating and the articles produced by such method.

A variety of decorative and ornamental coatings are commercially available. The patterns of such coatings comprise various arrangements of pigmented portions, some of which are said to be marbelized. However, these so-called marbelized coatings appear to represent nothing more than a general diffusion or mixing of pigments to form irregular stripes and patterns. While they bear resemblance to natural stone formations, they do not contain the irregular shaped sections or chips characteristic of natural marble and other stone formations.

It is, therefore, an object of the present invention to provide a novel method for making decorative and ornamental coatings.

Another object of our invention is to provide such a method wherein the coatings have irregular shaped sections or chips.

A further object of the present invention is to provide new articles of manufacture prepared by said process.

These and other objects will become apparent from the following detailed description.

It has now been discovered that highly decorative and ornamental coatings can be prepared by: (1) applying a pigmented, curable resinous coating composition to a substrate to form a base coat thereon; (2) allowing said base coat to set-up for a sufficient length of time to form an uncured but friable film on the surface thereof; (3) applying at least one pigmented, curable resinous coating composition over the base coat in a discontinuous manner; (4) subjecting said substrate to action to cause the discontinuous coating(s) to slide or flow in relation to the base coating; and (5) allowing the decorative and ornamental coating to set-up and harden. The sliding or flowing of the discontinuous coating(s) causes the film on the base coating to break-up which provides a coating having irregular shaped sections or chips of varying size of substantially the color of the base coat.

The following is a simplified flow diagram describing the steps of the aforementioned method:

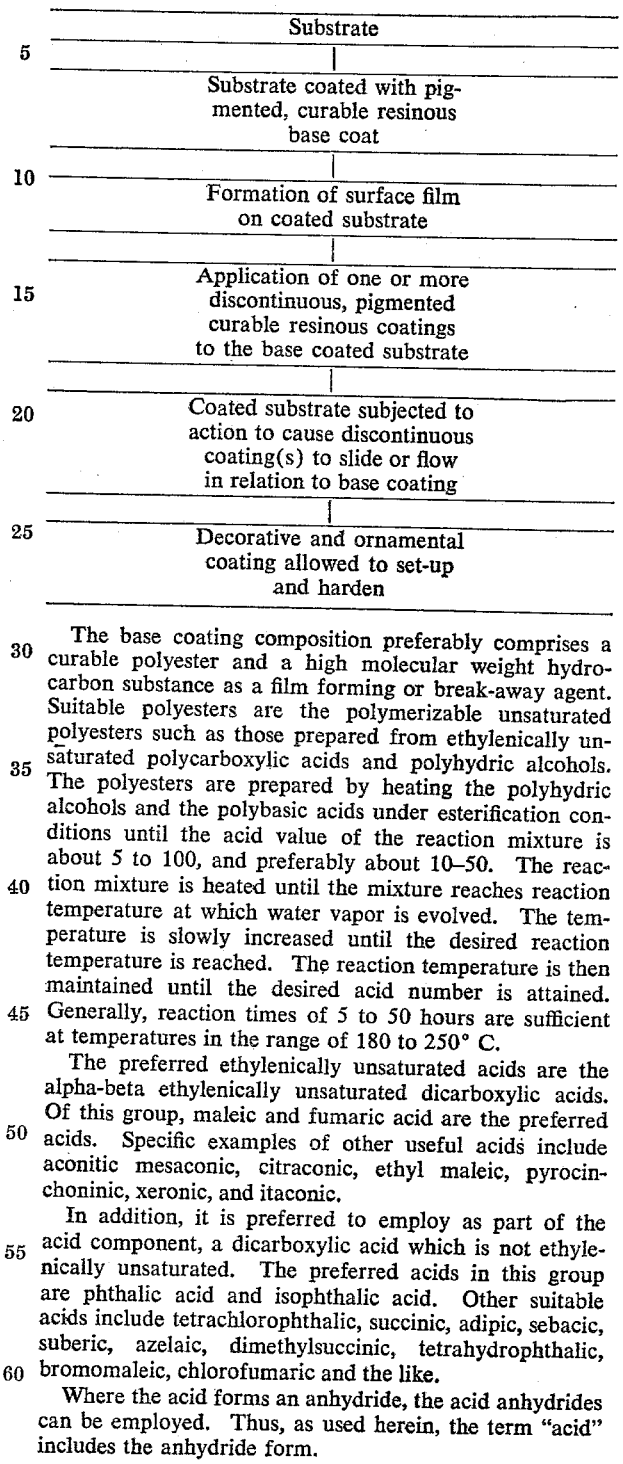

The base coating composition preferably comprises a curable polyester and a high molecular weight hydrocarbon substance as a film forming or break-away agent. Suitable polyesters are the polymerizable unsaturated polyesters such as those prepared from ethylenically unsaturated polycarboxylic acids and polyhydric alcohols. The polyesters are prepared by heating the polyhydric alcohols and the polybasic acids under esterification conditions until the acid value of the reaction mixture is about 5 to 100, and preferably about 10–50. The reaction mixture is heated until the mixture reaches reaction temperature at which water vapor is evolved. The temperature is slowly increased until the desired reaction temperature is reached. The reaction temperature is then maintained until the desired acid number is attained. Generally, reaction times of 5 to 50 hours are sufficient at temperatures in the range of 180 to 250° C.

The preferred ethylenically unsaturated acids are the alpha-beta ethylenically unsaturated dicarboxylic acids. Of this group, maleic and fumaric acid are the preferred acids. Specific examples of other useful acids include aconitic, mesaconic, citraconic, ethyl maleic, pyrocinchoninic, xeronic, and itaconic.

In addition, it is preferred to employ as part of the acid component, a dicarboxylic acid which is not ethylenically unsaturated. The preferred acids in this group are phthalic acid and isophthalic acid. Other suitable acids include tetrachlorophthalic, succinic, adipic, sebacic, suberic, azelaic, dimethylsuccinic, tetrahydrophthalic, bromomaleic, chlorofumaric and the like.

Where the acid forms an anhydride, the acid anhydrides can be employed. Thus, as used herein, the term "acid" includes the anhydride form.

If desired, a small amount of drying oil acids may be used in the polyesters. The preferred such acids are linoleic and oleic. Generally, these acids are added as the component in a mixture of acids derived from naturally occurring vegetable oils and fats or from naturally occurring animal oils and fats. The preferred fatty acid mixtures are those derived from soybean oil, linseed oil, tung oil and oiticia oil.

The preferred polyhydric alcohols are the low molecular weight dihydric alcohols such as ethylene glycol and propylene glycol. Specific examples of other suitable polyhydric alcohols are polyalkylene glycols, such as diethylene glycol, triethylene glycol and tripropylene glycol, butylene glycol, sorbitol, neopentyl glycol, pentaerythritol and glycerol. The polyhydric alcohol is normally used in an amount equivalent to or in slight excess of the total acid content.

The polyester coating material also contains a high molecular weight hydrocarbon. Said hydrocarbons are preferably aliphatic and have melting points above about 25° C. Illustrative thereof are paraffin wax, ozokerite wax and ceresine wax. Paraffin wax is the preferred hydrocarbon material and generally has a specific gravity of from 0.880 to 0.915, a melting point of 32–87° C., and consists of a mixture of solid hydrocarbons chiefly of the methane series obtained from petroleum. We have found that it is critical with polyester compositions to use such hydrocarbon materials and not other waxy substances such as beeswax, carnauba wax and the like. The hydrocarbon is employed in an amount sufficient to form a film on the base polyester coating and still allow the discontinuous resinous coating(s) to slide or flow in relation to the base polyester coating. Preferably, the high molecular weight hydrocarbon will be used in the range of about 0.05 to 0.40 weight percent based on the weight of the polyester.

The coating compositions also preferably contain a copolymerizable ethylenically unsaturated compound. Generally, these materials contain terminal ethylenic unsaturation which is characterized by the $CH_2=CH-$ group. The preferred ethylenically unsaturated monomer is styrene. Examples of other suitable alpha-beta ethylenically unsaturated monomers include alpha-methyl styrene, para-methyl styrene, divinyl benzene, indene vinyl acetate, methyl methacrylate, methyl acrylate, allyl acetate, diallyl phthalate, diallyl succinate, diallyl adipate, diallyl sebacate, triallyl phosphate, and triallyl cyanurate. Said ethylenically unsaturated compounds have a dual function. Thus, they make the polyester resin more fluid and also serve to crosslink the polyester resin at the time of curing to produce a crosslinked or three-dimensional resin. The amount thereof can accordingly be varied within relatively wide limits. Generally, the ethylenically unsaturated monomer is used in an amount sufficient to give the polyester desired fluidity for coating and/or to crosslink the polyester to the desired degree. Preferably, the monomer will be used in a weight ratio monomer to polyester of about 50:50 to 35:65. A particularly preferred ratio is 40:60 to 48:52.

A polymerization catalyst can also be added to the unsaturated polyester or to the unsaturated polyester-monomer mixture. A particularly suitable catalyst is methyl ethyl ketone peroxide. Other catalysts include benzoyl peroxide, tertiary butyl hydroperoxide, cyclohexyl hydroperoxide, acetyl peroxide, laurol peroxide, thioglycollic acid, amine-aldehyde condensation products and the like. Mixtures of such catalysts can be employed. Generally, the amount of catalyst will be in the range of about 0.01 to 10% by weight, based on the weight of the polyester. Said catalysts can be admixed with the polyester and hydrocarbon material with or without the ethylenically unsaturated monomer prior to application of the coating. Less preferably, the catalysts can be sprayed onto the substrate and then the coating applied or the catalyst can be sprayed onto the coating after its application to the substrate. These latter methods give the polyester coating composition a longer pot life, but the cure thereof is not as even as when the catalyst is admixed with polyester, hydrocarbon and monomer.

The polyester coating composition may also include other well-known addition agents such as polymerization accelerators, ultraviolet light absorbers, thixotropic agents, fillers and the like. The accelerator can be an oil-soluble metallic salt of the kind commonly used as a catalyst in the hardening of drying oil films. Metallic compounds which are useful as accelerators include the salts of metals, such as cobalt, lead, manganese, iron, vanadium, copper and cerium, with acids such as naphthenic, octoic, stearic, oleic, linoleic, myristic and other long chain fatty acids as well as aromatic, hydroaromatic, and alicyclic acids of sufficient carbon content to insure appropriate oil solubility. Other materials such as dimethylaniline also accelerate the polymerization and may be used in combination with a metallic salt such as cobalt, octoate. The accelerator can be incorporated into the polyester resin in an amount of about 0.05 to 2.0% by weight. If both the accelerator and catalyst are incorporated into the polyester coating composition, the pot life of such composition will accordingly be fairly short. Thus, it may be advisable to add either the catalyst or the accelerator to the polyester resin just prior to the coating operation. Or as indicated above, the catalyst may be added to or sprayed onto the substrate or onto the applied coating composition. It is also possible to prepare separate compositions, one containing the accelerator and the other containing the catalyst. These can then be blended just prior to the coating operation or separate coats of the compositions can be applied—i.e., first apply the accelerated composition and then the catalyzed composition or first apply the catalyzed composition and then the accelerated composition.

Ultraviolet light absorbers are added, if desired, to inhibit discoloration of the surface coating due to exposure to light. Any of these well-known compounds may be included. A preferred absorber is the material sold under the trademark "Permyl B-100" by Ferro Corporation. The ultraviolet light absorbers are generally used in amounts of about 0.05 to 2.5% based on the weight of the polyester.

Various thixotropic agents and filler materials can be included to body the polyester composition, improve abrasion resistance and the like. Examples of such materials are sand, vaporized silicas such as "Cab-O-Sil" available from Godfrey L. Cabot, Inc., cellulose fibers, asbestos, glass fibers and fibrous silicate materials. The amounts of such additives can vary widely, but will generally be within the range of about 1 to 60% by weight, preferably 1 to 40%, based on the weight of the polyester. A dispersing agent may be added to assist in maintaining the filler in suspension. Exemplary materials are the bentonite salts of quarternary ammonium compounds produced by the reaction of bentonite with organic bases. Such bentonite complexes are sold by the National Lead Company under the tradename "Bentone" with a numeral following the name and designating the number of carbon atoms in the quartenary compound from which the complex is derived. An exemplary quaternary ammonium bentonite complex is that sold under the designation "Bentone 38" which is dimethyl dioctadecyl ammonium bentonite. The dispersing agent may be used in amounts of about 0.25 to 2% by weight based on the weight of the polyester.

A polymerization inhibitor may also be added to the polyester or polyester-monomer compositions. Such compounds function to lengthen the shelf life of the coating compositions. Examples thereof are tertiary butyl catechol, hydroquinone and fatty amine hydrochlorides. The latter compounds are disclosed and claimed as stabilizers for the monomer and polyester mixtures in the copending application of Preston and Zvejnieks, Serial No. 137,720, filed September 13, 1961, now abandoned.

The coating compositions with or without accelerators, catalysts, ultraviolet light absorbers, fillers, polymerization inhibitors and the like also contain pigments. Any of a wide variety of organic or inorganic pigments can be used in any concentration to produce the desired color. Representative pigments include cadmium sulfide, phthalocyamine blue and green, titanium dioxide, lamp black, carbon black, chromic oxide, calcium carbonate, toluidine red, red lead, red iron oxide and the like. As indicated, the amounts of the pigment can vary widely but will generally be within the range of about 0.5 to 30% by weight based on the weight of the polyester. The base coating composition normally is pigmented to one color and the discontinuous coating or coatings applied thereover are pigmented to another color. Said colors may be complementary or contrasting or different shades of the same color. And the pigmentation is not limited to the colors of natural stone formations but can be of any decorative color desired.

The base coating composition is applied to any suitable substrate by hand or mechanically by any of a number of conventional coating application means including spraying, rolling, brushing, curtain coater, and the like. The base layer should be relatively smooth and uniform.

The substrates can be any of a wide variety of materials. Representative thereof are the following: woods, plasterboards, beaver-boards, pressed woods such as those sold under the trademarks "Masonite" and "Timblend," various pressed fiber boards, cardboard, paper, textile fabrics, plastic sheets, fiberglass, cement such as cement blocks, bricks, straw mat, insulating batts, asbestos, metal sheets and the like. When the substrate is desired as part of the finished article, it may be treated, if necessary, to improve adhesion of the decorative coating thereto. Thus, the substrate surface may be roughened, sanded or the like or a primer coating applied thereto. The latter method is particularly useful where metal substrates are employed. Thus, a primer such as an epoxy resin-polyamide composition may be applied to the metal substrate, cured to a definite Sward hardness and then a base polyester composition can be applied. The method of bonding polyesters generally to a metal substrate by the use of such a primer system is disclosed and claimed in the copending application of Workman, Serial No. 173,527, filed February 15, 1962, now abandoned.

The present invention also covers self-sustaining sheets of the decorative and ornamental coatings. Thus, the coating can be applied to a substrate and then stripped therefrom, for example, to provide such self-sustaining sheets. A metal substrate can be used for this purpose. Other materials having low adhesion between substrate and polyester can also be used—i.e., cellophane, Mylar, glass and the like. Release agents, such as silicones, can be applied to the substrate, followed by preparation of the decorative coating of the present invention. The coating, after cure, can then be stripped from the substrate. The substrate may also be waxed or greased to aid in removal of the self-sustaining sheets.

Before application of the discontinuous coating or coatings, the base coating as above described is allowed to set-up for a time sufficient to form a film on the surface thereof. Obviously, the amount of time will vary considerably depending upon the particular coating composition used, on whether catalysts, accelerators and/or ethylenically unsaturated monomers are used in combination with the coating composition, temperature, and the time spent in applying said base coat. For example, an accelerated and catalyzed coating will set-up much quicker than a coating which is not accelerated and/or catalyzed. Accordingly, the time lapse between application of the base coating and the discontinuous coating or coatings may be in the range of a few seconds to 15 minutes or more. Preferably, the discontinuous coating(s) is applied to the base coat within about 30 seconds to 10 minutes.

The discontinuous coating composition(s) may be the same as the base coating composition, differing only in the type of pigment used or color thereof. It is also possible to use coating compositions which are not airdriable. However, in such a case the final coating would have to be covered to exclude air in order that the coating layers would set-up and harden. A sheet of cellophane film or Mylar could be applied over the coating layers while they are still unset. Said sheets are gently smoothed with a roller or the like into initimate contact with the top surface of the coating layers in order to remove any entrapped air which might be present. After several hours, the cellophane or Mylar sheets are stripped off and the composite decorative and ornamental coating has become set and hardened.

As indicated, the second resinous coating composition is applied over the base coating in a discontinuous manner. By discontinuous is meant that less than 100% of the base coating is covered by the second resinous coating. Preferably, the discontinuous coating is applied to about 10 to about 90% of the surface area of the base coating. Where two or more discontinuous coatings are applied, they may cover 100% of the surface area of the base coating but individually they will cover less than 100%. Also, it is preferred that said discontinuous coating(s) is applied in a random fashion, that is, it is applied as various stripes or lines which may be irregular or wavy and as spots or splashes on the base surface. In this way a highly decorative and ornamental surface can be obtained which does not have any fixed, repetitive pattern. Of course, if desired, the discontinuous coating or coatings can be applied in a regular pattern.

Only one discontinuous coating need be applied over the base coat. However, it is preferred to use at least two such coatings and even more preferred to use three or more discontinuous coatings. Said coatings can be of complementary or contrasting colors or different shades of the same color. They can be applied in such a manner to overlap one another or cover separate areas of the base coat. Said coatings can be applied by a variety of methods. Thus, they can be poured from separate containers by hand or from an apparatus which has compartments such that the several materials are applied at the same time but not completely blended. It is also possible to spray said materials on the surface in a regular or irregular manner. The process of the present invention can be made continuous by using an apparatus which will first coat the base surface and then in a predetermined fashion apply the various discontinuous coatings. In this way, the decorative and ornamental coatings of the present invention can be duplicated to a high degree.

The thickness of the base coating and the discontinuous coating or coatings can be varied widely. For example, the base coating may be above 1 to 15 or more mils thick (preferably 6–10 mils) and the total depth of the decorative and ornamental coatings of our invention can be a few mils to 50 mils or more. Preferably, the total depth of the coating is in the range of about 15–40 mils. Of course, the desired coating thickness depends somewhat on the substrate used, the coating materials, and the use for which the coating is intended. For example, the thickness of the coating on floor tiles would normally be greater than that of tiles used in bathrooms and the like.

After the discontinuous coating or coatings have been applied, the substrate is immediately or substantially immediately subjected to action to cause the discontinuous coating(s) to slide or flow in relation to the base coating. By slide, as used herein, is meant that the discontinuous coating(s) moves in relation to the base coating and causes the film on the surface of the base coating to break-up and portions thereof to be indentified as "chips" on the surface. Both the base coating and the discontinuous coating may move or flow but the latter moves or flows faster than the base coating and thus causes the film to break at certain points. The breaking of the base coat film may be due to the hydraulic pressure of the superimposed discontinuous coat or by the undulation caused when the coat flows. The action required to cause such sliding can be accomplished in a number of ways. Thus, the substrate can be subjected to vibration or can be jerked or pushed rather violently. Preferably, the substrate is tilted to cause the various layers to flow towards one side or another. Particularly outstanding decorative effects are obtained by tilting the substrate followed by rotation. Thus, the substrate can be tilted at an angle of about 10 to 40°, for example, and then slowly rotated 360°. The coating materials are allowed to flow until they reach the lower edge of the substrate panel and then the panel is slowly rotated on an axis perpendicular to the plane surface. Also, the substrate can first be tilted in one direction and then tilted in the opposite direction. During such operation, the substrate panels can be rotated or subjected to an undulating motion. This procedure can also be made continuous. Thus, the substrate, coated with the base resin coat and the discontinuous coating or coatings, can be placed on a tilting turntable. The tilting and time of rotation can be standardized so that the decorative and ornamental coatings can be readily duplicated.

After the above-described step, the coatings are allowed to level out somewhat and various thin stripes of pigmented resinous material can optionally be applied thereto. The substrate can then be again subjected to the above-described sliding action. This causes the stripes to break-up and become irregular, thus producing a coating which closely resembles marble or like stone formations having irregular shaped chips or sections of base coating color with the stripes adding a veined or cracked appearance to the coating.

The coating, with or without the added striped effect, is preferably permitted to set-up and harden in air or in a baking or drying oven. However, in those cases where the discontinuous coatings are of the air-inhibited type, they can be covered with a cellophane or Mylar sheet as described above.

After the surface of the coating has hardened, it can be sanded to give it a smooth surface and then buffed to a high polish. The air-inhibited coatings which are permitted to set-up and harden in contact with a smooth polished surface require little, if any, sanding or polishing. Where it is desired to impart a further three-dimensional quality to the ultimate decorative and ornamental finish, a layer of transparent, unpigmented coating composition can be applied to the surface of the decorative coating. This is preferably accomplished by allowing the coating to set-up and harden and then by roughening the surface somewhat by sanding, followed by application of said transparent coating composition. The sanding or roughening improves the adhesion of the transparent layer to the decorative coating. Less preferably, the transparent layer may be applied before the other layers have set-up and hardened. Here adhesion would be good but the transparent layer would cause some hazing or blurring of the pigmented layers. Of course, for some purposes this hazing effect might be desired.

Also, as indicated above, the hardened and set-up coating can be stripped from certain substrates such as polished metal. The self-sustaining decorative sheet could then be used with a suitable adhesive for any desired application.

For many purposes, it is desirable to coat all of the surfaces of the substrate being coated. For example, architectural panels, tiles and the like are preferably given a seal coat on the back and all edge surfaces. This seal coat is preferably the same color as the predominate color of the decorative coating. Panels and tiles for outdoor use are preferably kiln dried. In addition, the application of the coating of this invention is not limited to plane surfaces. The coatings may also be applied to cylindrical bases and other surfaces having a generally circular cross-section by mounting the work piece so that it can be slowly rotated about its longitudinal axis in a horizontal plane at a slow rate just sufficient to prevent sagging and running of the coating material. To assist in the application of the coatings of the present invention to such rotating surfaces, it is desirable to use coating materials having thixotropic properties or which are somewhat more viscous than those used on flat or plane surfaces.

The invention may be illustrated further by reference to the following examples in which all "parts" are expressed as percent by weight, unless otherwise specified.

EXAMPLE I

A blend of 313.6 parts isophthalic acid, 370.2 parts maleic anhydride, 452.3 parts propylene glycol and 0.3 parts hydroquinone was heated in a stirred kettle equipped with a thermometer, reflux condenser and water trap at 390° F. until an acid value of between 15–25 was reached. The reaction mixture was then cooled to 350° F. and 1000 parts thereof added to 667 parts of styrene (containing 50 p.p.m. tertiary butyl catechol) warmed to about 160° F. After solution was complete, the resin-styrene solution was cooled. To 876.6 parts of the solution were added an additional 120 parts styrene, 0.8 parts paraffin wax having a melting point of 125–128° F., 1.6 parts of a solution of cobalt octoate in mineral spirits (6% metal), and 1.0 part dimethylaniline.

One hundred parts of the above-described polyester composition were mixed with 20 parts of a 65% white pigment polyester paste (pigment in an inert ester vehicle) and .5 part methyl ethyl ketone peroxide. This pigmented material was applied evenly on a level, horizontal surface of a Masonite panel to a thickness of about 8 to 12 mils with the aid of a roller. After approximately one minute, another portion of the polyester composition pigmented with 20% by weight 60% brown pigment polyester paste (same inert ester vehicle) was poured discontinuously over the white base coat in the form of stripes or lines approximately two inches apart from one edge to opposite edge. Diagonal and random wavy lines three inches apart were also applied. Another portion of the polyester composition pigmented with 20% by weight 60% tan pigment polyester paste (inert ester vehicle) was poured over, through or near the stripes of brown coating composition.

The panel was immediately placed on a tilting turntable and tilted at 35° from the horizontal or level position. At this point, the surface material slid toward the lower edge causing a breakup of the white base coating into irregular shaped sections or "chips" of varying sizes which floated to the surface. At the same time there was some intermingling of colors as the materials flowed. When the surface material started to slide off the lower edge of the surface, the panel was rotated 180° and held in position until surface material reached near uniform coverage at the lower edge. At this point, the panel was rotated slowly 360° in a clockwise (anti-clockwise could also be used) direction to facilitate movement and dispersal of material evenly on the surface. Rotation was continued for 25 to 45 seconds and then the panel was returned to a horizontal plane position. The coated panel was allowed to cure in air for about 2 hours to yield a highly ornamental and decorative coating which had a hard, smooth and level surface resembling polished marble. The base pattern was formed from unevenly distributed brown, tan and white material with distinct floating white chips resembling large grains of lighter colored stone.

EXAMPLE II

The procedure of Example I was repeated except that a second polyester composition was used in place of that of Example I. Said composition was prepared by blending the following materials:

| | Parts by weight |
|---|---|
| Polylite 8000 (a polyester manufactured by Reichold Chemicals, Inc., of White Plains, N.Y., from phthalic anhydride, maleic anhydride and propylene glycol having a non-volatiles content of 67±1%, styrene content of 33±, a maximum acid No. of 30, viscosity at 25° C. of 800–1000 cps. and a specific gravity of 1.12.) | 864.8 |
| Styrene monomer | 129.6 |
| Cobalt octoate solution in mineral spirits (6% metal) | 1.6 |
| Permyl B–100 ultraviolet light absorber | 3.2 |
| Paraffin wax (M.P. 125–128° F.) | 0.8 |

The described polyester composition was pigmented with the same pigments and amounts thereof as used in Example I. The % methyl ethyl ketone peroxide catalyst was increased from 0.5 part to 4.0 parts per hundred parts of the polyester composition. The white base coat and the brown and tan discontinuous coats were applied as in Example I. The pattern of the set-up and hardened coating was substantially the same as the coating of Example I, being highly decorative and closely resembling natural marble. This can be illustrated by reference to the drawing. FIGURE 1 is a plan view photograph of a portion of the coated substrate 1 wherein the coating layer contains irregular shaped sections or chips 2 as well as grained areas of contrasting colors 3.

EXAMPLE III

Figure 2:
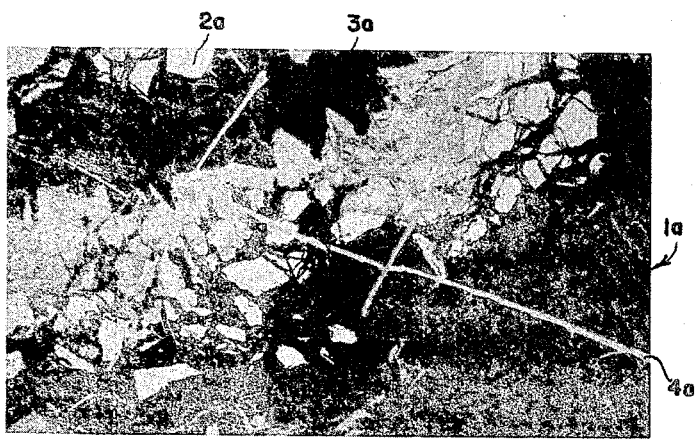

Example II was repeated but before the coating was allowed to set up and harden, very fine random lines of tan pigmented polyester composition were poured onto the surface starting at one edge of the panel and continuing across the panel to one of the remaining three edges. The turntable was then tilted to 35° from a horizontal position and was revolved slowly 360°. During the described tilting and rotation, the fine lines broke continuity slightly to simulate fault lines characteristic of rock masses. After the 360 degree rotation, the turntable was returned to a horizontal plane position. The panel was then cured in air for about two hours in a level horizontal position. The coating thus obtained resembled that of Example II except that it gave appearance of having some very natural and tridimensional looking fault lines in the brown marble surface in addition to the irregular shaped sections or chips. This is illustrated by FIGURE 2 which is a plane view photograph of a portion of the coated substrate 1a containing irregular shaped sections or chips 2a, grained areas of contrasting color 3a and fault lines 4a.

EXAMPLE IV

Example II was repeated except that paraffin wax having a melting point of about 150° F. was used in the polyester composition. A highly decorative and ornamental coating having substantially the same characteristics as the coating of Example II was obtained.

EXAMPLE V

A self-sustained sheet is prepared by applying the coating composition of Example II by the same procedure as set forth therein to a polished aluminum panel. After the coating is cured, it is easily peeled from the substrate surface. It is fairly flexible and can be applied to various substrates using a suitable adhesive.

EXAMPLE VI

Example II was repeated except that a clear coat of unpigmented polyester composition was applied evenly to the coated panel prior to the curing thereof. A coating was obtained which closely resembled that of Example II but which was somewhat blurred at the surface. The surface was smooth and hard, however, and the blurring or foggy effect is still highly decorative.

EXAMPLE VII

Example II was repeated except that a clear coat of unpigmented polyester composition was applied evenly over the surface of the coated panel after it had hardened and set-up. The panel was sanded lightly prior to the application of the clear coating in order to improve the adhesion of the clear coat to the decorative and ornamental coating. The coated panel of this example, after cure of the clear layer, had the same irregular shaped sections or chips and other characteristics of the coated panel of Example II and, in addition, had a three-dimensional effect due to the clear, unpigmented coating.

EXAMPLE VIII

Example II was repeated except that a sheet of asbestos paper was substituted for the Masonite board. A highly decorative and ornamental coating resulted having essentially the same pattern as the coating of Example II. However, the coated panel of this example was fairly flexible and was substantially more fire resistant due to the use of the asbestos substrate.

EXAMPLE IX

Example II was repeated except that neither the base polyester coating composition nor the discontinuous coating compositions contained methyl ethyl ketone peroxide. Instead, said catalyst was sprayed heavily onto the untreated Masonite substrate before application of the coatings and was also sprayed heavily onto the coatings after the tilting and rotation steps. The pattern of the ornamental and decorative coating was substantially the same as that of Example II, but required about 48 hours to set-up and harden.

EXAMPLE X

Example IX was repeated except that no methyl ethyl ketone peroxide was sprayed onto the untreated Masonite substrate. Instead, about 3 parts of said catalyst per hundred parts of coating composition were sprayed onto the coated panel after formation of the highly decorative and ornamental pattern. The coating hardened and set-up in air in about 3½ hours. The good pattern was maintained, but some of the irregular shaped sections or chips were slightly spotted or lacy looking from the catalyst spraying.

Examples IX and X demonstrate that the pot life of the coating compositions can be extended by spraying the catalyst onto the patterned coating and/or the untreated substrate.

EXAMPLE XI

Example II was repeated except that ½ of the total pigment content was replaced by 290 mesh silica flour in all of the polyester coating formulations. An excellent coating was obtained which had substantially the same pattern as that of Example II. The set-up and hardened coating had improved abrasion resistance and thus is particularly suitable for floor tiling and the like application.

EXAMPLES XII AND XIII

Example XI was repeated except that an additional 20 parts and 30 parts of silica flour was used to each 100 parts of the polyester compositions. Movement of the coating materials on the substrate was somewhat slower during the tilting and rotation steps but the finally cured coatings had excellent patterns which closely resembled those of Examples II and XI and also had very high abrasion resistance.

EXAMPLE XIV

A blend of 38 parts phthalic anhydride, 25 parts fumaric acid and 37 parts propylene glycol was heated in a stirred flask equipped with a thermometer, reflux condenser and water trap at 390° F. until an acid value of between 38 and 43 was reached. The reaction mixture was then cooled to 290° F. and 150 parts per million hydroquinone were added thereto. The reaction mixture was divided and used to prepare two separate polyester formulations. The first was prepared by adding 49 parts of the reaction product to a warmed (140° F.) solution of 32 parts styrene monomer (containing 50 parts per million tertiary butyl catechol), 0.13 part of a solution of cobalt octoate in mineral spirits (6% metal), 0.26 part Ferro Permyl B–100 (ultraviolet light absorber) and 0.07 part paraffin wax. The second formulation was prepared in the same manner as the first but 2 parts of methyl ethyl ketone peroxide was substituted for the 0.13 part cobalt octoate solution. Thus, the first polyester composition is accelerated and the second is catalyzed. Each of said formulations was then further divided and white, tan and brown 60% polyester pigment pastes added thereto (inert ester vehicles) in a ratio of 82:18 by weight.

A 4–6 mil coating of the white accelerated (contains cobalt octoate) polyester composition was applied to a hardboard panel. This was followed by application of a 4–6 mil coating of the white catalyzed (contains methyl ethyl ketone peroxide) polyester composition over the accelerated coating. Both of these coatings were applied with a curtain coater. This base coating was allowed to set-up for about 90 seconds and then a discontinuous coating of the brown pigmented polyester coating compositions was applied. This was accomplished by first applying stripes of the accelerated brown pigmented coating over the white base coat, said stripes being about 2 inches apart. Stripes of catalyzed and accelerated brown pigmented polyester were applied immediately thereafter and interposed directly over the first stripe. These applications thus gave a discontinuous coating in the form of stripes which consisted of three layers of brown pigmented polyester-accelerated, catalyzed and accelerated. These stripes were then dragged with a forked device consisting of 4 tines to accomplish a limited amount of intermixing of the coating materials constituting each stripe. Another series of stripes angular to those described above were then applied in the same manner using the tan pigmented polyester compositions. In these stripes the catalyzed material was first applied followed by application of the accelerated material and another layer of the catalyzed material. These stripes were also dragged to accomplish a limited amount of intermixing. The coated panel was then tilted and rotated as in Example II. There was obtained a rich looking, colored, marble-like pattern in the coating which was about 25–35 mils thick. This highly decorative and ornamental coating was allowed to set-up and harden and then clear coatings of accelerated and then catalyzed (unpigmented) polyester compositions were applied thereover and allowed to cure.

The above example shows that the pot-life of the polyester compositions can be extended by using two compositions—one accelerated and one catalyzed. The procedure of said example could also be made continuous by passing the panel through the various coating, mixing and curing steps at a predetermined rate.

EXAMPLE XV

A decorative coating was prepared using different formulations for the base coat and the discontinuous coats. The base coating composition was prepared by mixing 80 parts of the accelerated polyester formulation of Example XIV with 2 parts methyl ethyl ketone peroxide and 20 parts 65% white pigment polyester paste (pigment in an inert ester vehicle). The discontinuous coating compositions (one pigmented dark green and the other burnt green) were prepared by mixing 30 parts epoxy resin, 30 parts curing agent, 8 parts styrene, 0.27 part paraffin wax and 13.65 parts 60% pigment paste (pigment in an inert ester vehicle). The epoxy resin used was a condensation product of epichlorohydrin and 2,2-bis(p-hydroxyphenyl)propane having an epoxy equivalent weight of about 177. The curing agent was a reaction product of epoxidized tall oil fatty acids having an oxirane oxygen content of about 2% and tetraethylene pentamine (4 equivalents amine per equivalent epoxide). Said reaction product had an amine number of about 600 and was prepared by reacting the acids and amine at about 150° C. for 4 hours. The discontinuous coating compositions were prepared approximately 15 minutes before application to the substrate.

The pigmented polyester composition was applied to a ¼ inch tempered masonite panel with a brush to provide a 10–12 mil thick coating. After approximately one minute, the dark green and burnt green epoxy resin compositions were applied to the white base coat in a discontinuous manner by pouring each from separate containers. The panel was then tilted and rotated for 45 seconds in the same manner as set forth in Example I. A decorative coating having large and distinct white chips or irregular shaped sections was produced.

The present invention is particularly useful for the production of decorative and ornamental protective coatings in simulation of variegated marbles, agates, onyx and the like. The colors of the coatings can be varied widely as described above. Particularly striking results are obtained using a white base coat and two or more shades of green as the discontinuous coatings. Also, combinations of black and maroon or red give coatings of exceptional beauty. The coatings and coated articles are useful for the production of walls; floors; architectural facings; tops for tables, counters, vanities, desks and the like; fireplaces; in tile form for all purposes for which marble, ceramic and plastic tile is used; bases for lamps, desk sets, sculpture and the like; and in general, for all purposes that decorative and ornamental coatings are used.

It is to be understood that the invention is not to be limited to the exact details of operation or the compositions, methods and articles shown and described, as obvious modifications will be apparent to those skilled in the art and the invention is to be limited only by the scope of the appended claims.

The embodiments of the invention in which an exclusive property or privilege is claimed are defined as follows:

1. The process of producing a decorative and ornamental coating which comprises: (1) applying a pigmented, curable resinous coating composition to a substrate to form a base coating thereon; (2) allowing said base coating to form a friable film on the surface thereof; (3) applying at least one pigmented, curable resinous coating composition over the base coating in a discontinuous manner, the colors of the compositions of steps (1) and (3) being different; (4) while both the discontinuous coating and the base coating remain flowable, subjecting the substrate to action to cause the discontinuous coating to slide in relation to the base coating thereby causing the friable film on the surface of the base coating to break to provide irregular shaped sections of the base coating on the surface of the composite coating; and (5) allowing the decorative and ornamental coating to set-up and harden.

2. The process of claim 1 wherein the colors of the coating compositions of steps (1) and (3) are selected from the group consisting of contrasting colors, complementary colors, and different shades of the same color.

3. The process of claim 1 wherein the action of step (4) comprises tilting the substrate and then rotating said substrate.

4. The process of claim 1 wherein a clear, unpigmented layer of curable, resinous coating material is applied to the set-up and hardened decorative and ornamental coating.

5. The process of claim 1 wherein a clear, unpigmented layer of resinous material is applied to the coated substrate after step (4) and before step (5).

6. The process of claim 1 wherein the substrate has a smooth, non-adhering surface and after setting-up and hardening (5), the decorative and ornamental coating is stripped from said substrate.

7. As a new article of manufacture, the self-sustaining film product produced by the process of claim 6.

8. The process of claim 1 wherein thin stripes of a pigmented, curable resinous coating composition in simulation of fault lines are applied to the coated substrate after step (4) and before step (5).

9. As a new article of manufacture, the coated product produced by the process of claim 1.

10. The process of producing a decorative and ornamental coating which comprises: (1) applying a coating composition comprising a polymerizable, unsaturated polyester, a high molecular weight hydrocarbon film forming agent and a pigment to a substrate to form a base coating thereon; (2) allowing said base coating to form a friable film on the surface thereof; (3) applying at least one pigmented, curable resinous coating composition over the base coating in a discontinuous manner, the colors of the compositions of steps (1) and (3) being different; (4) while both the discontinuous coating and the base coating remain flowable, subjecting the substrate to action to cause the discontinuous coating to slide in relation to the base coating thereby causing the friable film on the surface of the base coating to break to provide irregular shaped sections of the base coating on the surface of the composite coating; and (5) allowing the decorative and ornamental coating to set-up and harden.

11. The process of claim 10 wherein the coating composition of step (1) also contains a copolymerizable ethylenically and unsaturated monomer.

12. The process of claim 11 wherein the copolymerizable ethylenically unsaturated monomer is styrene and the coating composition of step (3) comprises a polymerizable, unsaturated polyester, styrene and a pigment.

13. The process of claim 10 wherein at least one of the coating compositions of steps (1) and (3) also contains a polymerization catalyst.

14. The process of claim 10 wherein at least one of the coating compositions of steps (1) and (3) also contains a polymerization accelerator.

15. The process of claim 10 wherein at least one of the coating compositions of steps (1) and (3) also contains an ultraviolet light absorber.

16. The process of claim 10 wherein at least one of the coating compositions of steps (1) and (3) also contains a thixotropic agent.

17. The process of claim 10 wherein at least one of the coating compositions of steps (1) and (3) also contains a filler.

18. The process of claim 10 wherein at least one of the coating compositions of steps (1) and (3) also contains a diluent.

19. The process of claim 10 wherein at least one of the coating compositions of steps (1) and (3) also contains a polymerization inhibitor.

20. The process of claim 10 wherein the substrate has a smooth, non-adhering surface and after setting-up and hardening (5), the decorative and ornamental coating is stripped from said substrate.

21. As a new article of manufacture, the self-sustaining film product produced by the process of claim 20.

22. As a new article of manufacture, the coated product produced by the process of claim 10.

23. The process of claim 10 wherein the amount of the high molecular weight hydrocarbon is in the range of about 0.05 to 0.350 weight percent based on the weight of the polyester.

24. The process of claim 10 wherein the high molecular weight hydrocarbon of the coating composition of step (1) is paraffin wax.

References Cited by the Examiner

UNITED STATES PATENTS

| 506,394 | 10/1893 | Goldsmith | 117—45 |
| 631,295 | 8/1899 | Goldsmith | 117—45 |
| 758,501 | 4/1904 | VonBeust | 117—45 |

FOREIGN PATENTS 774,807  5/1957  Great Britain.

RICHARD D. NEVIUS, *Primary Examiner.*

UNITED STATES PATENT OFFICE
CERTIFICATE OF CORRECTION

Patent No. 3,219,735　　　　　　　　　　　　November 23, 1965

Elizabeth M. Iverson et al.

It is hereby certified that error appears in the above numbered patent requiring correction and that the said Letters Patent should read as corrected below.

Column 9, line 9, for "33±" read -- 33±1% --.

Signed and sealed this 20th day of September 1966.

(SEAL)
Attest:

ERNEST W. SWIDER　　　　　　　　　　　　EDWARD J. BRENNER
Attesting Officer　　　　　　　　　　　　Commissioner of Patents